United States Patent [19]

Semen et al.

[11] Patent Number: 4,895,889

[45] Date of Patent: Jan. 23, 1990

[54] PRECERAMIC COMPOSITIONS

[75] Inventors: John Semen; John J. Rogers, both of Baton Rouge, La.

[73] Assignee: Ethyl Corporation, Richmond, Va.

[21] Appl. No.: 193,105

[22] Filed: May 12, 1988

[51] Int. Cl.$^4$ .............................................. C08K 3/34
[52] U.S. Cl. ..................................... 524/443; 501/97; 264/63; 428/405; 427/220; 427/226
[58] Field of Search .............................. 501/97; 264/63; 428/404, 405, 698, 699; 427/220, 221, 226; 524/443

[56] References Cited

U.S. PATENT DOCUMENTS

| | | | |
|---|---|---|---|
| 4,482,669 | 11/1984 | Seyferth et al. | 524/442 |
| 4,535,007 | 8/1985 | Cannady | 501/97 X |
| 4,543,344 | 9/1985 | Cannady | 501/92 |
| 4,612,383 | 9/1986 | Laine et al. | 556/412 |
| 4,645,807 | 2/1987 | Seyferth et al. | 525/474 |
| 4,650,837 | 3/1987 | Seyferth et al. | 525/478 |
| 4,659,850 | 4/1987 | Arai et al. | 556/409 |
| 4,675,424 | 6/1987 | King, III et al. | 501/97 X |
| 4,835,207 | 5/1989 | Semen et al. | 524/443 |

FOREIGN PATENT DOCUMENTS

| | | | |
|---|---|---|---|
| 0146802 | 7/1985 | European Pat. Off. | 501/97 |
| 0123869 | 8/1982 | Japan | 501/97 |

*Primary Examiner*—William R. Dixon, Jr.
*Assistant Examiner*—Karl Group
*Attorney, Agent, or Firm*—Patricia J. Hogan

[57] ABSTRACT

Low density silicon nitride ceramics having improved bending and specific strengths over known silicon nitride ceramics derived from silicon nitride powder and polysilazane precursors are prepared by (A) intimately mixing about 50-85% by weight of silicon nitride powder with about 15-50% by weight of a preceramic polysilazane binder, (B) pulverizing the mixture to form particles having a particle size smaller than 105 micrometers, (C) separating from those particles any particles having a particle size larger than about 105 micrometers, (D) molding the resultant composition having a particle size not larger than about 105 micrometers, and (E) pyrolyzing the molded composition in an inert atmosphere to a temperature of about 1200°-1450° C.; said preceramic binder being at least one polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

9 Claims, No Drawings

PRECERAMIC COMPOSITIONS

FIELD OF INVENTION

This invention relates to silicon nitride ceramics, i.e., ceramics composed predominantly of silicon nitride, and more particularly to preceramic compositions and processes for preparing them.

BACKGROUND

It is known that silicon nitride ceramics having acceptably high strength can be obtained by a reaction bonding process but that such processes have the disadvantage of being very time-consuming, requiring, e.g., 72 hours or more for completion. As disclosed in U.S. Pat. Nos. 4,543,344 (Cannady) and 4,612,383 (Laine et al.), it is also known that silicon nitride ceramics can be derived from polysilazane precursors. However, the strengths of silicon nitride ceramics derived from mixtures of silicon nitride powders and polysilazane precursors have hitherto been quite poor. To overcome the disadvantages of these known methods of preparing silicon nitride ceramics, it would be desirable to find a way of deriving silicon nitride ceramics from mixtures of silicon nitride powders and polysilazane precursors that would result in the ceramics' having high strength, i.e., a strength higher than that of the known silicon nitride ceramics derived from silicon nitride powders and polysilazane precursors, e.g., a bending strength of at least about 23 kg/mm$^2$ and a specific strength of at least about 10 (kg/mm$^2$)/(g/cc).

U.S. Pat. Nos. 4,482,669 (Seyferth et al.-I), 4,645,807 (Seyferth et al.-II), 4,650,837 (Seyferth et al.-III), and 4,659,850 (Arai et al.) disclose the utility of polysilazanes as preceramic materials, and Seyferth et al.-I teach that their polysilazanes are especially useful as binders for ceramic powders such as silicon nitride. Silicon nitride ceramics prepared from these silicon nitride powder/polysilazane binder compositions are composed predominantly of silicon nitride, e.g., about 92% silicon nitride or more, with the balance being mostly silicon carbide. Seyferth et al.-I do not disclose the typical densities and bending strengths of ceramics made from their preceramic compositions. However, Wiseman, "The Development and Application of Polysilazane Precursors to Ceramics," a Massachusetts Institute of Technology thesis, 1984, shows that these densities were generally about 2.1–2.2 g/cc and the bending strength were poor. Wiseman showsa recognition, though, of its being desirable to minimize alkali metal contamination and to use preceramic polymers having a sufficiently high molecular weight, or mixtures (such as 80/20 mixtures) of such polymers with lower molecular weight polymers, to maximize strength.

SUMMARY OF INVENTION

An object of this invention is to provide novel preceramic polysilazane compositions capable of forming high strength silicon nitride ceramics having low density.

Another object is to provide processes for preparing such compositions and converting them into high strength silicon nitride ceramics having low density.

These and other objects are attained by (A) intimately mixing about 50–85% by weight of silicon nitride powder with about 15–50% by weight of a preceramic polysilazane binder, (B) pulverizing the mixture to form particles having a particle size smaller than 105 micrometers, i.e., particles which pass through a 105 micrometer sieve, (C) separating from those particles any particles having a particle size larger than about 105 micrometers, i.e., particles which are retained on a 105 micrometer sieve, (D) molding the resultant composition having a particle size not larger than about 105 micrometers, and (E) pyrolyzing the molded composition in an inert atmosphere to a temperature of about 1200–450° C.; said binder consisting essentially of at least one polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

DETAILED DESCRIPTION

Silicon nitride powders that can be employed in the practice of the invention are commercially-available materials that vary from very fine to coarse powders. However, the preferred silicon nitride powders are those which have a particle size of about five micrometers or less, preferably one micrometer or less; and particularly good results have been obtained with silicon nitride powders having mean particle sizes of about 0.1–1.0 micrometer.

The binder that is mixed with the silicon nitride powder is a polysilazane of Seyferth et al.-I (the teachings of which are incorporated herein in toto by reference), i.e., a polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent, or a mixture of such polysilazanes. For example, it may be one or more polysilazanes prepared by reacting methyldichlorosilane with ammonia, treating the ammonolysis product with potassium hydride,and quenching the resultant product with methyl iodide or dimethylchlorosilane. The utilizable polysilazanes are solids which are soluble in common organic solvents, such as aliphatic or aromatic hydrocarbons, dialkyl or alicyclic ethers, etc., including solid mixtures of normally solid polysilazanes and normally liquid polysilazanes. The solid, soluble polysilazanes having the higher molecular weights are preferred to permit the use of faster pyrolysis rates.

The amount of polysilazane used is such that the preceramic composition comprises about 50–85% by weight of silicon nitride powder and about 15–50% by weight of binder, preferably about 70–80% by weight of silicon nitride powder and about 20–30% by weight of binder.

If desired, the compositions may be modified by the inclusion of optional ingredients, such as polyisobutenyl succinimides, other dispersing agents, and other additives that have been used in known ceramic molding compositions. For example, one or more lubricants such as higher fatty acids and the esters and amides thereof, higher alcohols, paraffin wax, and low molecular weight polyolefins can be used. When employed, such additives are used in minor amounts, e.g., up to about 5% by weight of dispersing agent or up to about 15% by weight of a lubricant, based on the weight of the remainder of the composition.

The preceramic compositions of the invention are prepared by intimately mixing the silicon nitride powder and binder, pulverizing the mixture to form particles having a particle size smaller than 105 micrometers, as hereinabove defined, and separating from those particles any particles having a particle size larger than about 105 micrometers. Neither the particular manner in which the silicon nitride powder and binder are mixed nor the particular manner in which the particle size is reduced appears to be critical. For example, mills in general are useful for the reduction in particle size. However, it is particularly convenient to conduct the process by dispersing the silicon nitride powder in an organic solvent solution of the binder (e.g., a solution in an aliphatic or aromatic hydrocarbon, such as hexane, toluene, etc., or a dialkyl or alicyclic ether, such as diethyl ether, tetrahydrofuran, etc.) preferably at room temperature, removing the solvent (e.g., by rotary evaporation followed by vacuum distillation), ball milling the resultant chunks of powder/binder, and then sieving to remove any particles having a particle size larger then about 105 micrometers.

Ceramics may be prepared from the preceramic compositions by molding them at a temperature and pressure suitable for the parts being made, usually at a temperature of about 60°-225° C. and a pressure of about 6.8-343 MPa, using any suitable shaping process, such as compression, injection, or transfer molding, or extrusion, and then pyrolyzing the molded composition in an inert atmosphere, such as nitrogen, argon, etc., to a temperature of about 1200°-1450° C., preferably about 1300° C. The time required for the pyrolysis varies with the ultimate pyrolysis temperature, being at least one hour at the preferred pyrolysis temperature of about 1300° C., a shorter time at higher temperatures, and a longer time at lower temperatures. It is particularly useful to pyrolyze the molded composition by (1) heating it to 1300° C. at rates of 60° C./hour from room temperature to 60° C., 30° C./hour from 60° C. to 260° C., 120° C./hour from 260° C. to 1260° C., and 60° C./hour from 1260° C. to 1300° C., maintaining the temperature at 1300° C. for one hour, cooling to 900° C. at a rate of 120° C./hour, and conducting the remainder of the cooling at an ambient rate or (2) heating it to 1400° C. at rates of 60° C./hour from room temperature to 60° C., 15° C./hour from 60° C. to 260° C., 120° C./hour from 260° C. to 1260° C., and 60° C./hour from 1260° C. to 1400° C. maintaining the temperature at 1400° C. for 45 minutes, and cooling to room temperature.

Ceramics prepared from the preceramic silicon nitride/polysilazane compositions of the invention have comparable densities but better bending strengths than ceramics prepared from comparable preceramic compositions having a larger particle size. In fact, the use of the novel preceramic compositions can lead to the formation of silicon nitride ceramics having a specific strength (i.e., a bending strength/density ratio) of at least 10 (kg/mm$^2$)/(g/cc) —a strength particularly desirable for aerospace and other demanding and critical structural applications. The fact that this combination of properties in the ceramic can be achieved by the reduction in particle size of the preceramic composition is surprising, and the reason for the beneficial effect of the particle size reduction is not understood.

The following examples are given to illustrate the invention and are not intended as a limitation thereof. In the processes described in these examples, thoroughly-dried equipment, purified raw materials, and an inert atmosphere were used to protect the polysilazanes from attack by water and other substances having active hydrogens during synthesis and storage of the polysilazanes and during processing and storage of the polysilazane-containing materials used to make the silicon nitride ceramics.

EXAMPLE I

Synthesis of Polysilazane A

Part A

A suitable reaction vessel was charged with 14L of anhydrous tetrahydrofuran and cooled to about 0 C., after which 1497 g (13.01 mols) of methyldichlorosilane was added to the vessel, and stirring at about 60 rpm was begun. A slow steady stream of 745 g (43.7 mols) of anhydrous ammonia gas was introduced into the vessel at a flow rate such that the reaction pressure was maintained at or below 206.8 kPa, and the reaction temperature stayed in the range of 0°-10° C. Then the reaction mixture was stirred at 0° C. for about three hours, after which the coolant flow on the vessel was shut off, and the system was put under gentle nitrogen purge to allow the reaction mass to warm to room temperature and the majority of the excess ammonia to vent off. Then the reaction mass was poured into flasks and filtered in a dry box with a sintered glass filter having pore diameters of 4.0-5.5 micrometers.

Part B

The clear filtrate from Part A was discharged into a polymerization vessel which had previously been charged with a suspension of 2.5g (0.063 mol) of KH powder in about 100 mL of anhydrous tetrahydrofuran and chilled to 0 C. to begin the polymerization reaction. The reaction mixture was maintained at 0 C. for about 8 hours and then allowed to warm gradually to about 22° C. After a total of about 26 hours of polymerization at 0°-22° C., the reaction was quenched by adding about 11.9 g (0.063mol) of dimethylchlorosilane to the polymerization solution.

The polymer product was isolated to a dry powder by vacuum distillation, after which the dry residue was redissolved in anhydrous cyclohexane. The cyclohexane solution was filtered and the filtrate was vacuum dried to provide a white solid which was designated as Polysilazane A. Proton NMR spectra of the polymer in deuterated chloroform solvent had resonances consistent with those reported in Seyferth et al.-I for polysilazane and with a small amount, i.e., 2.2% by weight, of residual tetrahydrofuran, as well as about 7% by weight of cyclohexane. Elemental oxygen by neutron activation was about 0.2%, corrected for residual solvent; and the potassium content was determined by inductively coupled plasma emission spectroscopy to be less than 5 ppm, based on the weight of polymer.

EXAMPLE II

Synthesis of Polysilazane B

Example I was essentially repeated except that the reaction mixture for the polymerization was prepared by adding the KH suspension to the ammonolysis product, the amount of KH employed was 0.6 mol %, based on the amount of methyldichlorosilane charged in the ammonolysis reaction, and the polymerization was conducted entirely at 0° C. for a total of 0.7 hour. The Polysilazane B formed by the process was a viscous liquid having a tetrahydrofuran content of 0.5% by weight, an elemental oxygen content of 0.4% (corrected for residual solvent), and a potassium content of less than 5 ppm.

EXAMPLE III

Synthesis of Polysilazane C

Example II was repeated to form another viscous liquid which was designated as Polysilazane C. It was not analyzed for impurities.

EXAMPLE IV

Synthesis of Polysilazane D

Example II was essentially repeated except that the polymerization time at 0° C. was 10 hours. The Polysilazane D formed by the process was a solid having a potassium content of about 10 ppm. It was not analyzed for other impurities.

The following examples describe molding formulations prepared from the polysilazanes of the preceding examples and commercial silicon nitride powders. Each of the silicon nitride powders is predominantly alpha-silicon nitride. The silicon nitride powder designated as $Si_3N_4-1$ has an average particle size of 0.8 micrometer and a specific surface area of 7–10 $m^2/g$, the silicon nitride powder designated as $Si_3N_4-2$ has an average particle size of 0.1–0.3 micrometer and a specific surface area of 10 $m^2/g$, the silicon nitride powder designated as $Si_3N_4-3$ has an average particle size of 0.7 micrometer and a specific surface area of 19–22 $m^2/g$, and the silicon nitride powder designated as $Si_3N_4-4$ has an average particle size of 0.6 micrometer and a specific surface area of 12 $m^2/g$.

EXAMPLE V

Preparation of Formulation I

A mixture of 14.4g of Polysilazane A, 3.8g of Polysilazane B, and 0.3g of a commercial polyisobutenyl succinimide dispersant in 200 g of anhydrous toluene was stirred magnetically for about 15 minutes to obtain a homogeneous solution, after which 42 g of $Si_3N_4-1$ powder was added to the solution. The mixture was stirred magnetically for 60 minutes and then ultrasonicated for about one hour to disperse the silicon nitride powder, and the majority of the toluene was then flashed off to provide a non-flowing residue. The residue was dried under high vacuum for several days and then pulverized lightly with a mortar/pestle to obtain a free-flowing formulation powder which was then ball milled for about one hour with about 200 cc of silicon carbide milling balls having a diameter of about 0.25 inch in a 2.5-pint mill jar, after which the milling balls were removed. The milled powder was then dry-sieved through a screen having size openings of 106 micrometers. The powder that did not pass through the sieve was ball-milled again until all of the formulation passed through.

EXAMPLE VI

Preparation of Additional Formulations

The general procedures of Example V, i.e., slurry-blending, ultrasonicating, drying, coarse-grinding, ball-milling, and sieving, were used to prepare additional formulations having the compositions shown in Table I. The dispersant included in the formulations was a commercial polyisobutenyl succinimide dispersant.

TABLE I

| Formulation | Ingredient | Parts |
| --- | --- | --- |
| II | Polysilazane A | 16 |
|  | Polysilazane C | 4 |
|  | $Si_3N_4-1$ | 80 |
|  | Dispersant | 0.5 |
| III | Polysilazane A | 24 |
|  | Polysilazane C | 6 |
|  | $Si_3N_4-1$ | 70 |
|  | Dispersant | 0.5 |
| IV | Polysilazane D | 24 |
|  | Polysilazane C | 6 |
|  | $Si_3N_4-2$ | 70 |
|  | Dispersant | 0.5 |
| V | Polysilazane D | 24 |
|  | Polysilazane C | 6 |
|  | $Si_3N_4-3$ | 70 |
|  | Dispersant | 0.5 |
| VI | Polysilazane D | 24 |
|  | Polysilazane C | 6 |
|  | $Si_3N_4-4$ | 70 |
|  | Dispersant | 0.5 |

EXAMPLE VII

Molding of Formulation I

Each of six green discs having a nominal diameter of 12.7 mm and a nominal thickness of 2.54 mm was molded from Formulation I. In the preparation of each of these discs, about 0.8 g of the formulation was loaded into a suitable mold in a nitrogen glovebox; and the mold was evacuated to less than about 133 pascals, sealed under vacuum, transported to a hydraulic press, reconnected to a vacuum line, and evacuated to a pressure of not more than about 67 pascals—a vacuum level that was maintained throughout the remainder of the molding process. The evacuated mold was placed snugly between the press platens, which were preheated to about 182° C. and allowed to preheat for 10 minutes, after which a force of 2268-2722 kg (175-210 MPa pressure) was applied to the mold and maintained for about five minutes. After compression, the mold was sealed under vacuum and transported back into the glovebox, where it was allowed to cool for about five minutes. After cooling, the molded green disc was removed from the mold and stored in the glovebox. The density was determined to be about 2.05 g/cc.

EXAMPLE VIII

Pyrolysis of Formulation I

The green discs prepared in Example VII were pyrolyzed in a nitrogen atmosphere by heating them to 1300° C. at rates of 60 /hour from room temperature to 60° C., 30° C./hour from 60° C. to 260° C., 120° C./hour from 260° C. to 1260° C., and 60° C./ hour from 260° C. to 1300° C., maintaining the temperature at 1300° C. for one hour, cooling to 900° C. at a rate of 120° C./hour, and allowing ambient-rate cool down from 900° C. to about room temperature, i.e., shutting down the furnace heaters when the temperature reached 900° C. and allowing the resultant furnace conditions to determine the rate of the remainder of the cool down. After the pyrolyzed specimens had cooled to below 100° C., they were removed from the furnace and stored immediately in a dry nitrogen atmosphere. Their densities were calculated from weight and dimension data to be 2.23 g/cc. All of the disc specimens underwent uniform, linear shrinkage of about 6% as a result of the pyrolysis.

The pyrolyzed specimens were subsequently stored in air at ambient temperature and humidity for several weeks, during which time their weight increased by 2-3% —the maximum weight gain having been reached in about seven days. After the specimens had equilibrated to constant weight, their bending strengths were determined by the biaxial-loading-stress method described in Godfrey, *Materials Science & Technology*, Vol. 1, No. 7 (1985), pp. 510–515. The discs formed from Formulation I were determined to have an average bending strength of 27.4 kg/mm$^2$ and an average specific strength of 12.3 (kg/mm$^2$)/(g/cc).

EXAMPLE IX

Molding and Pyrolysis of Additional Formulations

About six green discs were molded from each of Formulations II–VI essentially as in Example VII, and the green discs were pyrolyzed essentially as in Example VIII. The pyrolyzed disc specimens were equilibrated in ordinary air, after which their bending strengths were determined as in Example VIII. The densities, average bending strengths, and average specific strengths of the discs formed from the various formulations are shown in Table II.

TABLE II

| Formulation | Density (g/cc) | Bending Strength (kg/mm$^2$) | Specific Strength (kg/mm$^2$)/(g/cc) |
|---|---|---|---|
| II | 2.27 | 23.2 | 10.2 |
| III | 2.22 | 30.1 | 13.6 |
| IV | 2.08 | 25.2 | 12.1 |
| V | 2.22 | 27.4 | 12.3 |
| VI | 2.11 | 27.0 | 12.8 |

It is obvious that many variations can be made in the products and processes set forth above without departing from the spirit and scope of this invention.

What is claimed is:

1. A preceramic composition having a particle size not larger than about 105 micrometers and comprising an intimate mixture of (A) about 50-85% by weight of silicon nitride powder and (B) about 15-50% by weight of a preceramic polysilazane binder consisting essentially of at least one polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

2. The composition of claim wherein the silicon nitride powder has a mean particle size of about 0.1–1.0 micrometer.

3. The composition of claim wherein the binder consists essentially of at least one polysilazane prepared by reacting methyldichlorosilane with ammonia, treating the ammonolysis product with potassium hydride, and quenching the resultant product with dimethylchlorosilane.

4. The composition of claim 1 wherein the binder content is about 20-30% by weight.

5. The composition of claim 4 wherein the binder content is about 30% by weight.

6. The composition of claim 1 comprising an intimate mixture of (A) about 70% by weight of silicon nitride powder having a mean particle size of about 0.1-1.0 micrometer and (B) about 30% by weight of a preceramic polysilazane binder consisting essentially of at least one polysilazane prepared by reacting methyldichlorosilane with ammonia, treating the ammonolysis product with potassium hydride, and quenching the resultant product with dimethylchlorosilane.

7. A process which comprises intimately mixing about 50-85% by weight of silicon nitride powder with about 15-50% by weight of a preceramic polysilazane binder, pulverizing the mixture to form particles having a particle size smaller than 105 micrometers, and separating from those particles any particles having a particle size larger than about 105 micrometers; said binder consisting essentially of at least one polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

8. The process of claim 7 wherein the silicon nitride powder is dispersed in an organic solvent solution of the binder, the solvent is removed, and the resultant chunks of powder/binder are ball milled and then sieved to form an intimate powder/binder mixture having a particle size not larger than about 105 micrometers.

9. The process of claim 7 wherein about 70-80% by weight of the silicon nitride powder is mixed with about 20-30% by weight of the binder.

* * * * *